Dec. 6, 1960 D. H. WEISE 2,963,296

RECORD-CHANGING PHONOGRAPHS

Filed Feb. 27, 1956 3 Sheets-Sheet 1

Inventor
Dominikus H. Weise
By Ralph B. Stewart
Attorney

Dec. 6, 1960 D. H. WEISE 2,963,296

RECORD-CHANGING PHONOGRAPHS

Filed Feb. 27, 1956 3 Sheets-Sheet 2

Inventor
Dominikus H. Weise
By Ralph B. Stewart
Attorney

Dec. 6, 1960 D. H. WEISE 2,963,296

RECORD-CHANGING PHONOGRAPHS

Filed Feb. 27, 1956 3 Sheets-Sheet 3

Inventor
Dominikus H. Weise
By Ralph B. Stewart
Attorney

United States Patent Office 2,963,296

Patented Dec. 6, 1960

2,963,296

RECORD-CHANGING PHONOGRAPHS

Dominikus Heinz Weise, Munich, Germany, assignor to Max Grundig, Furth, Bavaria, Germany Filed Feb. 27, 1956, Ser. No. 568,093

Claims priority, application Germany Apr. 5, 1955

6 Claims. (Cl. 274—10)

This invention relates to phonographs, and in particular to a record-changing arrangement for automatic phonographs.

Various constructions of record-changing mechanism are known which operate on the principle that the records are ejected or released one at a time from an upper position and land on a supporting turntable in such a way that the ejected records are stacked up on the turntable to form a pile.

This type of operation makes it possible to play a maximum of only 10 to 12 records, since the accumulation of records on the turntable reaches a point to cause a drop in speed of the turntable on the one hand, and to raise the reproducer to too-great an inclination of the reproducing needle on the other hand.

The system which is the subject of this application involves a method of reproducing records and mechanical means for changing records up to about 50 record discs of the same size.

An object of the present invention is to devise a record-changing arrangement capable of handling a large number of records without having more than one record on the turntable at any time.

Another object of the invention is to devise a novel arrangement for discharging a record from the turntable into a record magazine or bin after each playing operation.

A further object is to devise a novel arrangement for supporting a stack of records above the turntable independently of the turntable spindle or of any support passing through the center of the turntable. My invention also involves a novel arrangement for mounting the spindle of a record-stack so that it may be removed from and replaced on its support during the playing of a record and without disturbing the playing operation.

One embodiment of my invention is illustrated in the accompanying drawing in which.

Figure 1:
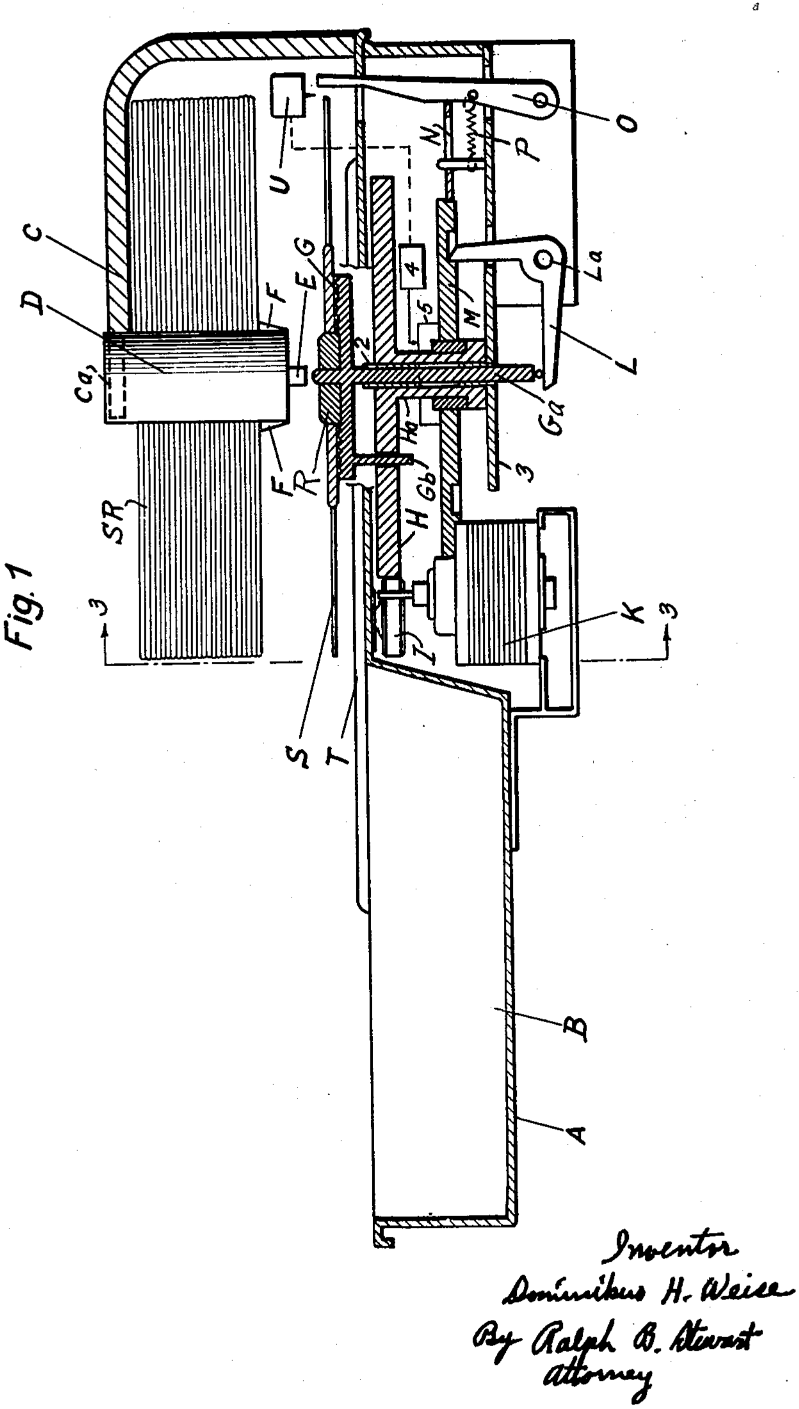
Figure 1 is a sectional view of Figure 2 taken along the line 2—2, certain elements being shown in elevation for clarity of showing.

In the drawing, the parts embodying the present invention are shown in structural detail, while other parts commonly employed in automatic phonographs are illustrated only diagrammatically.

Figure 2:
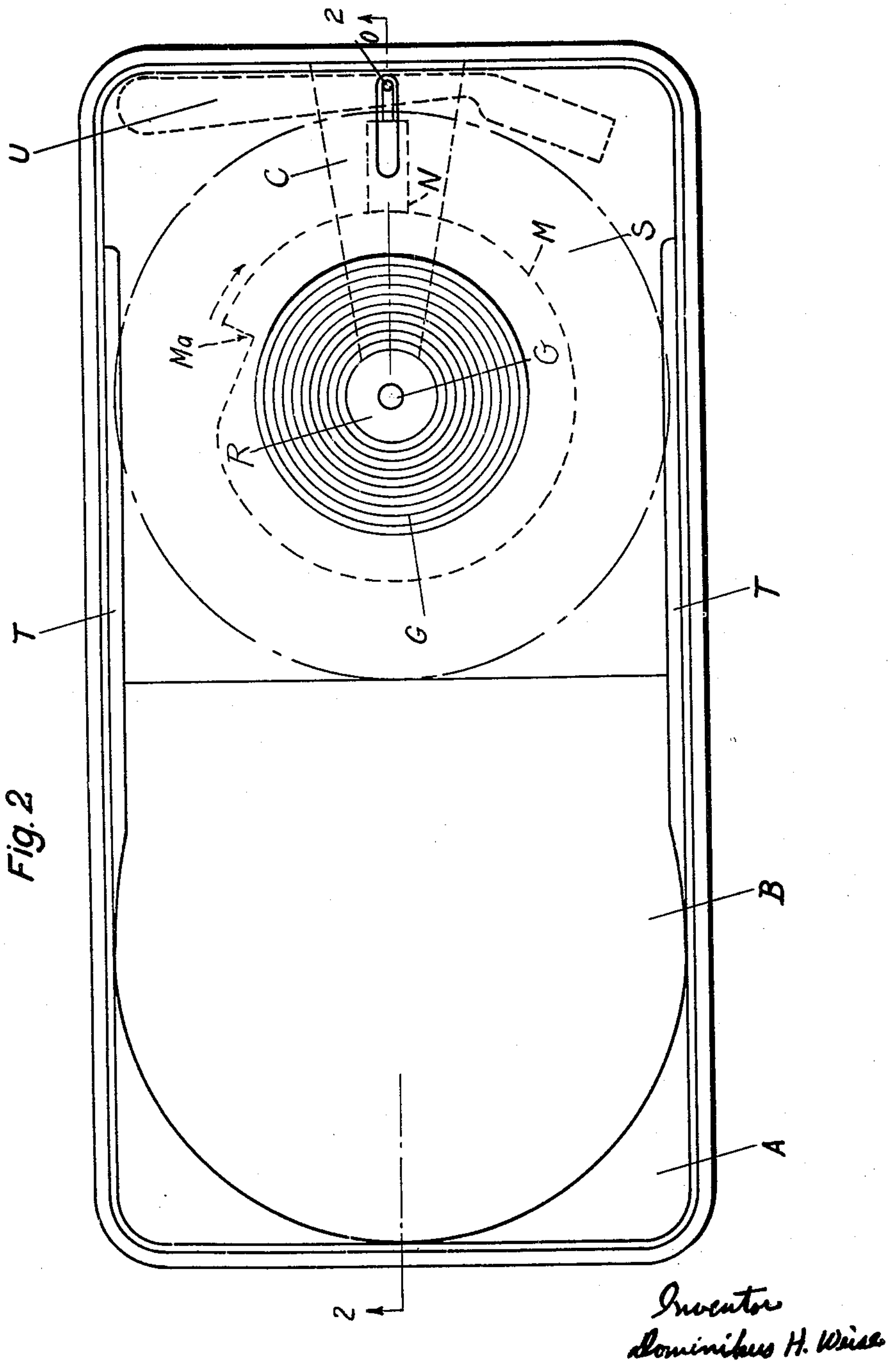
Figure 2 is a plan view of Figure 1, but with certain elements being removed for a better showing of other elements.

Referring to the drawing, the phonograph is provided with a base which includes an elongated plate A which is so shaped that the record-changing mechanism is disposed under it on the right-hand side in Figures 1 and 2, while the left-hand portion of the plate is formed into a trough or bin B to provide a record magazine. Secured to the right end of the frame is a supporting arm C which extends upwardly and then horizontally in overhanging relation with the right-hand portion of the plate A. A record-supporting spindle D is removably attached at its upper end to the free end of arm C and extends vertically downward in axial alignment with the turntable G.

The spindle D may be removed from the arm C so that a stack of records SR may be placed on the spindle and the spindle is then replaced on the supporting arm. For this purpose, the arm C may have a reduced extension C*a* which extends into a transverse slot formed in the upper end portion of the spindle D. Extending out of the lower end of the spindle D is a record-release button E which controls a pair of releasable record-supporting elements or latches F extending out of slots formed in opposite sides of the spindle D and being retractable into the spindle by upward movement of the button E by any suitable mechanism, to release only the bottom-most record for each upward oscillation of the button E. The specific form of the record-releasing mechanism is not important to the present invention, and other forms may be used, such as that illustrated in U.S. patent to Johnson 1,879,291.

The turntable G is provided with an axle G*a* extending vertically downward through the center of a driving plate H having a tubular axle H*a* surrounding the inner axle G*a*. Turntable G is driven from plate H by a coupling pin G*b* extending downwardly from the turntable through a hole in the driving plate H which is driven from a friction drive wheel I which in turn is driven by a suitable motor K. The axle G*a* may be journaled in a bearing sleeve 2 rigidly mounted on a fixed plate 3 and forming a bearing post for tubular axle H*a*.

The arrangement for discharging a record from the turntable and releasing the lower-most record in the stack SR includes a bell-crank lever L pivoted to the machine frame at L*a* and having a horizontal arm extending beneath the end of the turntable axle G*a* and a vertical arm extending upwardly into a camming groove formed in the lower face of a cam disc M mounted to rotate about the tubular axle H*a* of the driving plate H. The cam plate M is normally held stationary, but is caused to rotate through one revolution when a record is to be discharged from the turntable and a new record is to be released from the stack SR. In the stationary position of plate M, lever L holds the turntable at the normal playing position shown in Figure 1. At the end of the recording on the record, the tone arm carrying the reproducer U is oscillated by the inner eccentric groove on the record to effect operation of a known form of re-cycling mechanism to raise the tone arm and return it to its non-playing position, such mechanism being represented by the rectangle 4 in Figure 1. Operation of re-cycling mechanism 4 also trips a one-revolution clutch represented at 5 to couple plate M to axle H*a* and cause one complete revolution of plate M.

Figure 3:
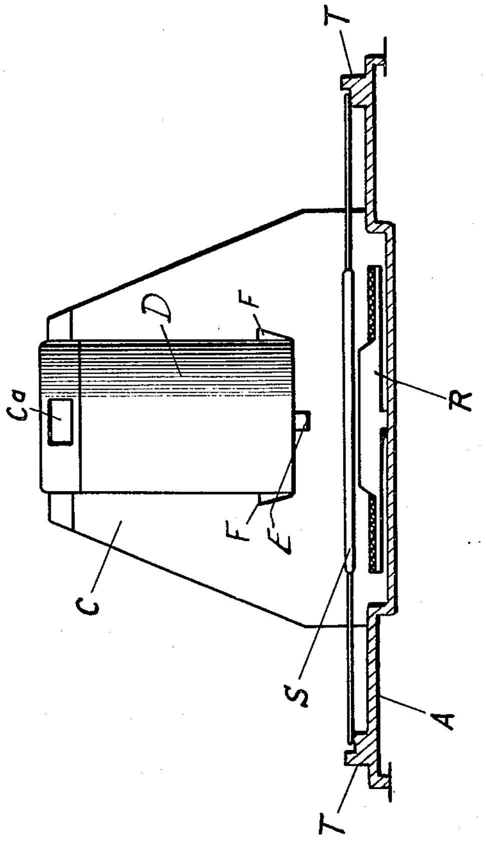
Figure 3 is a sectional view of Figure 1 taken along the line 3—3, certain elements being removed as explained hereinafter.

During the first portion of the revolution of the cam M, the lever L lowers the turntable G below its normal playing position so that edge portions of the record S engage the two rails T, arranged in parallel relation along the outer edges of the plate A, and forming a trackway leading to the record bin B, see Figures 1 and 3.

To initiate movement of the record along the trackway and into the bin B, a lever O is pivoted at its lower end to the frame of the machine and projects upwardly through an opening in the plate A and extends slightly above the edge of the record deposited upon the rails T. A spring P normally urges the lever O in the direction of the bin B, but the lever is normally held in the position shown in Figure 1 by a sliding member N which engages the outer periphery of the cam plate M. As shown in Figure 2, the edge of the plate M is provided with a notch or offset $Ma$ into which the sliding member N may drop after the plate M has moved to a position where the record S has been deposited on the rails T. When the member N drops into the notch $Ma$, the lever O under the action of spring P strikes the edge of the record S to initiate movement of the record toward the bin B, the movement being assisted by the centrifugal action of the rotating record. The guideway formed of rails T terminates at about the middle of the trough B and then has a free space of a diameter greater than the diameter of the sound record so that the record after impinging on the vertical wall of the trough is forced to fall to the bottom of the bin in a horizontal position.

Further turning of the cam plate M after the record has reached the bin B effects upward movement of the turntable G beyond its normal playing position and into engagement with the release button E to effect release of the lower-most record in the stack SR. The released record drops onto the turntable G and is centered on the turntable by the centering element R having a tapered upper portion for assuring a frictionless drop-off of the record from the free-hanging stack to the rotating turntable. During the remaining movement of the cam plate M, the turntable is lowered to its playing position, and thereafter the mechanism 4 moves the tone arm inwardly and then downwardly at a point where the reproducer U will engage the start of the sound groove on the record. After the record has been played, the cycle of operation described above is repeated.

The arrangement described above for discharging records from the turntable is especially useful with plastic records of equal diameter, such as those known today under the term "17 c.m. records." These records are not damaged by the ejection operation and require only a very small ejection force because of their small weight (40 grams).

It will be noted that the arrangement for supporting the stack of records SR from the horizontal carrier arm C provides for a minimum elevation of the arm C above the turntable, and it also provides for the convenient removal and replacement of the stack above the turntable without interference with other parts. This result is due to the manner of mounting the spindle D on the horizontal end portion $Ca$ of the arm C so that the stack is removed from its mounting by horizontal movement of the spindle D parallel with the plane of the turntable.

I claim:

1. In a phonograph having a turntable and recycling means for depositing a plurality of records upon said turntable, one at a time, the combination of a guideway comprising a pair of parallel rails arranged on opposite sides of said turntable below the record-supporting surface thereof, a record bin located at the end of said guideway, first cam means controlled by said recycling means for lowering said turntable below the level of said guideway to deposit a played record on said guideway, a throw-off lever positioned on the opposite side of said turntable from said record bin and being pivotally supported so that the free end thereof is movable transverse of the turntable axis and into striking engagement with the edge of the record supported on said rails, spring means urging said throw-off lever toward said record, and second cam means controlled by said recycling means for moving said lever into cocked position against said spring and for suddenly releasing said lever for free movement under the action of said spring to strike said record substantially simultaneously with the deposit of said record on said rails, whereby said record is driven along said rails by the impact of said lever.

2. A phonograph arrangement according to claim 1 wherein said first and second cam means comprises a single cam disk mounted below said turntable and being journaled for rotation about the axis of said shaft independently of said turntable and having a first camming surface thereon for controlling the vertical movement of said turntable and a second camming surface for controlling the operation of said throw-off lever.

3. In a phonograph, the combination of a turntable having a supporting shaft, bearing means mounting said shaft in a vertical position for rotation about its axis and for sliding movement along its axis, a circular driving disc journalled for rotation about the axis of said shaft in a fixed horizontal plane below said turntable, a driving coupling between said disc and said turntable permitting vertical movement of said turntable with respect to said disc, a cam plate mounted below said driving disc for rotation about the axis of said shaft and having a camming surface thereon, means coupling the cam plate to the disc to drive the cam plate for one revolution, a cam follower cooperating with said camming surface and engaging said turntable shaft to move said turntable from a playing position to a lower discard position and back to the playing position during one revolution of said cam plate, a second cam surface on said cam plate, a throw-off lever mounted in a vertical position and having its lower end pivoted below said cam plate and its upper end extending upwardly above the level of said turntable at a point radially beyond the outer edge of a record carried by said turntable when in playing position, a spring normally urging said lever inwardly to strike the edge of the record, and a connection between said lever and the second camming surface for normally holding said lever in its outer position against the action of said spring, said second camming surface operating to release said lever to strike said record at a fixed point in the rotation of said cam plate upon lowering of the turntable to the discard position by the first-mentioned camming surface.

4. An automatic record changer for playing the upper side of the lowermost record in a stack of records comprising in combination, a turntable, a vertically movable support for said turntable normally holding said turntable in a playing position and being movable to elevate said turntable into an upper position above said playing position, a stack-supporting carrier arm extending horizontally over said turntable, a record-stack spindle having an aperture extending transversely through the upper end portion thereof and forming a socket for slidably receiving the end portion of said carrier arm for supporting said spindle above said turntable in axial alignment therewith and with the lower end thereof spaced above said turntable when in said playing position, releasable record-supporting means embodied in the lower end portion of the spindle and being operable upon each actuation thereof to release the lowermost record, said releasable means including a member mounted on the lower end of the spindle and being moved by the turntable when elevated above its playing position, to effect operation of said record-supporting means to release the lowermost record of the stack from the spindle.

5. An automatic record changer according to claim 4 wherein said vertically movable support for said turntable is operable to move said turntable into a lower position below said playing position, means for conveying records away from said turntable comprising a guideway formed of a pair of parallel rails arranged on opposite sides of said turntable at a level below the record-supporting surface thereof when in playing position, said rails being positioned to guide a record from said turntable by engaging opposite edge portions of the record when said turntable is moved to its lower position, and throw-off means operated in timed relation with the movement of the turntable into its lowermost position for moving said record in the direction of said rails.

6. An automatic record changer for playing the upper side of the lowermost record in a stack of records comprising in combination, a turntable, a vertically movable support for said turntable normally holding said turntable in a playing position and being movable to elevate said turntable into an upper position above said playing position, a stack-supporting carrier arm extending horizontally over said turntable, a record-stack spindle for extending through the center openings of the records of a stack and having releasable record-supporting means embodied in the lower end portion thereof, and being operable upon each actuation thereof to release the lowermost record, said releasable means including a member and cooperating means on the carrier arm and the upper end of the record-stack spindle for slidably supporting the record-stack spindle for movement parallel to the turn-table to a position in alignment with the turntable axis, said releasable record-supporting means including a member mounted on the lower end of the spindle and being moved by the turntable when elevated above its playing position to effect operation of the record-supporting means to release the lowermost record of the stack from the spindle.

References Cited in the file of this patent

UNITED STATES PATENTS

| | | |
|---|---|---|
| 1,312,461 | Wadsworth | Aug. 5, 1919 |
| 1,831,331 | Thornton | Nov. 10, 1931 |
| 1,879,291 | Johnson | Sept. 27, 1932 |
| 2,677,549 | Burt | May 4, 1954 |